(12) United States Patent
Hormigo Cebolla et al.

(10) Patent No.: US 9,968,853 B2
(45) Date of Patent: May 15, 2018

(54) MEDIA SYSTEM AND METHOD

(71) Applicant: VIRTUALLY LIVE (SWITZERLAND) GMBH, Zurich (CH)

(72) Inventors: Jesús Hormigo Cebolla, Malaga (ES); Jamil Nadim El-Imad, London (GB)

(73) Assignee: VIRTUALLY LIVE (SWITZERLAND) GMBH, Zurich (CH)

( * ) Notice: Subject to any disclaimer, the term of this patent is extended or adjusted under 35 U.S.C. 154(b) by 0 days. days.

(21) Appl. No.: 15/413,728

(22) Filed: Jan. 24, 2017

(65) Prior Publication Data
US 2017/0182421 A1    Jun. 29, 2017

Related U.S. Application Data

(63) Continuation of application No. 13/362,621, filed on Jan. 31, 2012, now Pat. No. 9,576,330, which is a (Continued)

(30) Foreign Application Priority Data

Mar. 7, 2008    (GB) .................................. 0804274.9
Apr. 30, 2008    (EP) .................................. 08155517

(51) Int. Cl.
*A63F 9/24*        (2006.01)
*A63F 13/65*       (2014.01)
(Continued)

(52) U.S. Cl.
CPC ............ *A63F 13/65* (2014.09); *A63F 13/213* (2014.09); *A63F 13/352* (2014.09); *H04L 67/38* (2013.01);
(Continued)

(58) Field of Classification Search
None
See application file for complete search history.

(56) References Cited

U.S. PATENT DOCUMENTS 6,380,890 B1 *    4/2002    Smith ................... G01C 21/26
                                                              342/357.31
6,999,083 B2      2/2006    Wong et al.
(Continued)

FOREIGN PATENT DOCUMENTS

CN        1610838 A        4/2005
CN      101021836 A        8/2007
(Continued)

OTHER PUBLICATIONS

Yiming, You, English translationof Notification of Second office Action in Chinese Application No. 200980108152.0; dayed May 16, 2013; 16 pages; the State Intellectual Property Office of hte People's Republic of China; Beijing, China.
(Continued)

*Primary Examiner* — Paul A D'Agostino
(74) *Attorney, Agent, or Firm* — Marshall, Gerstein & Borun LLP

(57) ABSTRACT

A virtual world environment unit, and related methods, operable to simulate an actual live event in substantially real-time is disclosed. Also disclosed is an interactive media system configured to present a substantially real-time simulation of an actual live event involving a moveable object in an arena. Further disclosed is a method of providing and/or viewing a substantially real-time simulation of an actual live event involving a moveable object in an arena

20 Claims, 3 Drawing Sheets

Related U.S. Application Data continuation-in-part of application No. 12/921,052, filed as application No. PCT/GB2009/050222 on Mar. 5, 2009, now Pat. No. 8,128,469.

(51) Int. Cl.

| | | |
|---|---|---|
| *A63F 13/213* | (2014.01) | |
| *A63F 13/352* | (2014.01) | |
| *H04L 29/06* | (2006.01) | |
| *H04N 21/2187* | (2011.01) | |

(52) U.S. Cl.
CPC ...... *H04N 21/2187* (2013.01); *A63F 2300/69* (2013.01); *A63F 2300/8082* (2013.01)

(56) References Cited

U.S. PATENT DOCUMENTS

| | | | |
|---|---|---|---|
| 8,128,469 B2 | 3/2012 | Hormigo Cebolla et al. | |
| 2001/0003715 A1* | 6/2001 | Jutzi | A63F 13/12 463/40 |
| 2002/0183961 A1* | 12/2002 | French | A63B 24/0003 73/379.04 |
| 2003/0038805 A1* | 2/2003 | Wong | A63F 13/12 345/473 |
| 2004/0178955 A1* | 9/2004 | Menache | A63F 13/06 342/463 |
| 2004/0224740 A1* | 11/2004 | Ball | A63F 13/10 463/6 |
| 2005/0110789 A1* | 5/2005 | Le Ouay | A63F 13/10 345/419 |
| 2005/0130725 A1* | 6/2005 | Creamer | A63F 13/10 463/1 |
| 2006/0046807 A1 | 3/2006 | Sanchez | |
| 2006/0173701 A1 | 8/2006 | Gurvey | |
| 2006/0211462 A1* | 9/2006 | French | A63B 24/0003 463/1 |
| 2007/0197247 A1 | 8/2007 | Inselberg | |
| 2007/0265090 A1 | 11/2007 | Barsness et al. | |
| 2008/0026838 A1* | 1/2008 | Dunstan | A63F 13/00 463/30 |
| 2008/0092065 A1* | 4/2008 | Jung | A63F 13/12 715/757 |
| 2008/0146302 A1 | 6/2008 | Olsen et al. | |
| 2008/0146339 A1* | 6/2008 | Olsen | A63F 13/12 463/42 |
| 2008/0161113 A1* | 7/2008 | Hansen | A63F 13/12 463/42 |
| 2008/0186330 A1* | 8/2008 | Pendleton | A63F 13/10 345/619 |
| 2008/0191009 A1 | 8/2008 | Gressel et al. | |
| 2008/0214303 A1* | 9/2008 | Hamalainen | A63F 13/10 463/32 |
| 2009/0023489 A1 | 1/2009 | Toneguzzo | |
| 2009/0062009 A1 | 3/2009 | Inubushi et al. | |
| 2009/0116641 A1 | 5/2009 | Bokor et al. | |
| 2009/0118016 A1 | 5/2009 | Ben-Artzi et al. | |
| 2010/0045664 A1 | 2/2010 | Ishida | |

FOREIGN PATENT DOCUMENTS

| | | |
|---|---|---|
| EP | 0722601 A1 | 7/1996 |
| EP | 0773514 A1 | 5/1997 |
| EP | 1070265 A1 | 1/2001 |
| EP | 1127457 A1 | 8/2001 |
| EP | 1198274 A1 | 4/2002 |
| FR | 2726370 A1 | 5/1996 |
| FR | 2869709 A1 | 11/2005 |
| GB | 2444407 A | 6/2008 |
| WO | WO-1998/046029 A1 | 10/1998 |
| WO | WO-2001/05476 A1 | 1/2001 |
| WO | WO-2002/071334 A2 | 9/2002 |
| WO | WO-2006/058957 A1 | 6/2006 |
| WO | WO-2006/097357 A1 | 9/2006 |
| WO | WO-2006/103662 A2 | 10/2006 |
| WO | WO-2007/061346 A1 | 5/2007 |
| WO | WO-2008/012797 A2 | 1/2008 |

OTHER PUBLICATIONS

Mafalda Pereira; International Search Report in PCT/GB2009/050222; dated Apr. 7, 2009; 3 pages; European Patent Office; Rijswijk, Netherlands.

European Patent Office; Extended European Search Report in European Patent Application No. 08155517.9; dated Sep. 9, 2008; 4 pages; European Patent Office; Rijswijk, Netherlands.

Mafalda Pereira; Interview Summary of telephonic interview held between Examiner Pereira and Attorney Sessford in European Patent Application No. 08155517.9; dated Mar. 4, 2010; 2 pages; European Patent Office; Rijswijk,Netherlands.

Mafalda Pereira; European Search Report in European Patent Application No. 08155517; dated Sep. 2, 2008; 2 pages; The Hague.

Mafalda Pereira; Communication Pursuant to Article 94(3) EPC in European Patent Application No. 08155517.9; dated Aug. 19, 2009; 6 pages; European patent Office; Rijswijk, Netherlands.

Dorothee Mulhausen; International Preliminary Report on Patentability in PCT/GB2009/050222; dated Sep. 7, 2010; 6 pages; International Bureau of WIPO; Geneva, Switzerland.

Mafalda Pereira; Written Opinion of the International Searching Authority in PCT/GB2009/050222; dated Sep. 7, 2010; 5 pages; European Patent Office; Rijswijk, Netherlands.

Yiming, You, English translation of Office Action in Chinese Patent Application No. 200980108152.0, dated Oct. 23, 2012, 15 pages, The State Inllectual Property Office of the People's Republic of China, Beijing, China.

\* cited by examiner

MEDIA SYSTEM AND METHOD

This application is a continuation of U.S. patent application Ser. No. 13/362,621, now allowed, filed Jan. 31, 2012, which is a continuation-in-part of U.S. patent application Ser. No. 12/921,052, filed Sep. 3, 2010, which in turn is a U.S. National Stage filing under 35 U.S.C. § 371 of International Application No. PCT/GB2009/050222, filed Mar. 5, 2009, which in turn claims priority to European Patent Application No. 08155517.9, filed Apr. 30, 2008, which in turn claims priority to British Application No. 0804274.9, filed Mar. 7, 2008.

TECHNICAL FIELD

This invention relates to a media system, components thereof and associated methods.

BACKGROUND

Consumer appetite for access to live events (such as music concerts and sporting events) has been growing in recent years. Technological developments have also increased consumer expectations and demands for interactivity in the media which they consume.

Thus far, the internet has only been used in a limited manner to provide consumers access to live events.

The conventional means of providing access to live events have many limitations. For example, actually attending a live event offers tremendous appeal, but the venue at which the live event is held will have a limited capacity. Furthermore, the price of a ticket to many of the most popular live events may be a barrier to some spectators. The distance that spectators may have to travel to reach the live events, and the associated inconvenience and cost, is yet another limitation on access to the event.

Television and radio broadcasts provide access to live events over a wider geographical area more conveniently. However, radio broadcasts fail to capture the visual appeal of the event and television footage is increasingly restricted to those who subscribe to expensive television packages (often provided through cable, satellite or terrestrial digital broadcasts). In addition, the popularity of such television services is thought to be likely to decline in the future with consumers seeking more interactive and less passive forms of entertainment.

SUMMARY

Embodiments of the present invention seek to ameliorate one or more problems associated with the prior art.

One aspect of the present invention provides an interactive media system configured to present a substantially real-time simulation of an actual live event involving a moveable object in an arena, the system comprising: a tag attachable to a moveable object involved in an actual live event in an arena; one or more base stations located relative to the arena and operable to receive a signal from the tag; a location platform configured to determine the location of the tag in the arena based on the signal received from the tag by the or each base station, and to output location data representing a location of the tag in the arena; a virtual world environment unit to simulate the actual live event including the arena, the object, and movement of the object in the arena using the location data for the tag; and an access interface in communication with the virtual world environment unit, the access interface being arranged to provide a user with access to the simulated arena and to permit the user to observe the simulated event in substantially real-time.

Preferably at least one of the one or more base stations are located inside the arena.

Advantageously, the system further comprises an optical reference unit configured to track the location of a further object in the arena optically and to output further location data representing a location of the further object in the arena, wherein the virtual world environment unit is adapted to simulate the actual live event including the further object and movement of the further object in the arena using the further location data.

Conveniently, the system further comprises one or more time stamp units arranged to associate time stamp data with the location data and the further location data such that the location data and further location data can be registered in the same time frame using the associated time stamp data.

Preferably, the system further comprises one or more additional tags attachable to respective additional objects involved in the actual live event, wherein the one or more base stations are operable to receive a signal from each respective tag; the location platform is configured to determine the location of each tag based on the signal received from that tag by the or each base station, and to output location data representing the locations of each tag in the arena; and the virtual world environment unit simulates the actual live event including the objects and movement of the objects in the arena using the location data for each tag.

Advantageously, the access interface includes a server to receive a user request to observe the simulated event and to transmit a data stream to the user, the data stream representing the simulated event and being suitable to be used to simulate the event on a user display.

Conveniently, the virtual world environment unit is configured to model one or more interactive elements with which a user may interact.

Preferably, the access interface is adapted to permit two or more users to observe the simulated event and can receive one or more interaction commands from a user which permit the user to interact with at least one other user.

Advantageously, the interaction commands are processed by the virtual world environment unit.

Another aspect of the present invention provides a location tracking system configured to track the location of a tag in an arena in substantially real-time during an actual live event, the system comprising: an array of base stations in a substantially uniform arrangement positioned relative to an arena, each base station being adapted to receive a signal from a tag and output location data relating to the received signal; and a location platform arranged to determine the location of the tag in the arena based on location data output at least one of the array of base stations in substantially real-time.

Preferably, the array includes at least three base stations.

Advantageously, the base stations of the array of base stations are substantially evenly spaced.

Conveniently, the array of base stations comprises an array of RFID tags.

Alternatively, the array of base stations comprises an array of RFID tag reader devices.

Preferably, the system further comprises an optical reference unit configured to track the location of a further object in the arena optically and to output further location data representing the location of the further object in the arena.

Advantageously, the system further comprises one or more time stamp units arranged to associate time stamp data with the location data and the further location data such that the location data and further location data can be registered in the same time frame using the associated time stamp data.

Another aspect of the present invention provides a location tracking system configured to track the location of a tag in an arena and a further object in the arena in substantially real-time during an actual live event, the system comprising: an array of base stations positioned relative to an arena, each base station being adapted to receive a signal from a tag and output location data relating to the received signal; a location platform arranged to determine the location of the tag in the arena based on location data output at least one of the array of base stations; and an optical reference unit configured to track the location of a further object in the arena optically and output location data relating to the location of the further object.

Preferably, the system further comprises one or more time stamp units arranged to associate time stamp data with the location data such that all of the location data can be registered in the same time frame using the associated time stamp data.

Another aspect of the present invention provides a virtual world environment unit operable to simulate an actual live event in substantially real-time, the simulation including a simulated arena based on library information for the arena, a simulated object in the arena, simulated movement of the object in the arena based on substantially real-time location data received by the unit for the object, and a simulated user in a virtual spectator area which is separate from the simulated arena.

Preferably, the unit is further operable to receive one or more interaction instructions from one or more users and to adapt one of the simulation of the user and an element in the virtual spectator area in accordance with the or each interaction instruction.

Another aspect of the present invention provides a method of providing a substantially real-time simulation of an actual live event involving a moveable object in an arena, the method comprising the steps of: tracking the location of a moveable object in an arena and generating location data representing the location of the object in the arena by utilizing one or more base stations located relative to the arena to receive a signal from a tag attached to the moveable object, and determining the location of the tag in the arena based on the signal received from the tag by the or each base station; transmitting the location data to a virtual world environment unit; generating a simulation of the event in the virtual world environment unit using the received location data to simulate the object in a simulated arena; and permitting a user to access the simulated arena and observe the simulated event in substantially real-time.

Preferably, the step of tracking the location of a moveable object includes the step of providing at least one of the one or more base stations inside the arena.

Advantageously, the method further comprises the step of tracking a further object using an optical reference unit configured to track the location of the further object in the arena optically and to output further location data representing a location of the further object in the arena, wherein the step of generating a simulation of the event further comprises simulating the further object and movement of the further object in the arena using the further location data.

Conveniently, the method further comprises the step of associating time stamp data with the location data and the further location data such that the location data and further location data can be registered in the same time frame.

Preferably, the method further comprises the step of tracking one or more additional moveable objects in the arena and generating location data representing the location of the or each additional object in the arena by utilizing one or more tags attachable to the or each respective additional object and receiving a signal from each respective tag at the one or more base stations, wherein the step of generating a simulation of the event further comprises using the location data to simulate the or each further object in the simulated arena.

Advantageously, the method further comprises the steps of receiving a user request to observe the simulated event and to transmitting a data stream to the user, the data stream representing the simulated event and being suitable to be used to simulate the event on a user display.

Conveniently, the method further comprises the step of modeling one or more interactive elements with which a user may interact.

Preferably, the method further comprises the step of permitting a user to access the simulated arena comprises the step of permitting two or more users to observe the simulated event; and the method further comprises the step of receiving one or more interaction commands from a user which permit the user to interact with at least one other user.

Advantageously, the method further comprises the step of processing the or each interaction command in the virtual world environment unit.

Another aspect of the present invention provides a location tracking method to track the location of a tag in an arena in substantially real-time during an actual live event, the method comprising: providing an array of base stations in a substantially uniform arrangement positioned relative to an arena; receiving, at a base station of the array of base stations, a signal from a tag and outputting location data relating to the received signal from the base station; and determining the location of the tag in the arena using a location platform based on the location output by the base station in substantially real-time.

Preferably, the step of providing an array of base stations comprises providing at least three base stations.

Advantageously, the step of providing an array of base stations comprises providing the base stations in a substantially evenly spaced arrangement.

Conveniently, the step of providing an array of base stations comprises providing an array of RFID tags.

Alternatively, the step of providing an array of base stations comprises providing an array of RFID tag reader devices.

Preferably, the method further comprises the steps of: tracking the location of a further object in the arena optically using an optical reference unit; and outputting further location data representing the location of the further object in the arena.

Advantageously, the method further comprises the step of associating a time stamp with the location data and the further location data such that the location data and further location data can be registered in the same time frame using the associated time stamp data.

Another aspect of the invention provides a method of tracking the location of a tag in an arena and a further object in the arena in substantially real-time during an actual live event, the method comprising: providing an array of base stations positioned relative to an arena; receiving, at a base station of the array of base stations, a signal from a tag and outputting location data relating to the received signal from the base station; determining the location of the tag in the arena using a location platform based on the location output by the base station in substantially real-time; optically tracking a further object in the arena using an optical reference unit; and outputting location data relating to the location of the further object.

Preferably, the method further comprises the step of associating time stamp data with the location data such that all of the location data can be registered in the same time frame using the associated time stamp data.

Another aspect of the present invention provides a method of operating a virtual world environment unit, the unit being operable to simulate an actual live event in substantially real-time, the method comprising the steps of: simulating an arena based on library information for the arena, simulating an object in the arena; simulating movement of the object in the arena based on substantially real-time location data received by the unit for the object; and simulating a user in a virtual spectator area which is separate from the simulated arena.

Preferably, the method further comprises the steps of: receiving one or more interaction instructions from one or more users; and adapting one of the simulation of the user and an element in the virtual spectator area in accordance with the or each interaction instruction.

Another aspect of the present invention provides a method of viewing a substantially real-time simulation of an actual event involving a moveable object in an arena, the method comprising the steps of: receiving, at a user unit, a substantially real-time simulation of a live event involving at least one moveable object in an arena; and receiving a simulation of the user in a spectator area of the simulated event, the spectator area being separate from the arena.

Another aspect of the present invention provides a virtual world environment unit operable to simulate an actual live event in substantially real-time, the simulation comprising a simulated arena based on library information for an arena comprising a spectator stand, a simulated object in an event area of the simulated arena said object being involved in the actual live event, simulated movement of the object in the event area of the simulated arena based on substantially real-time location data received by the unit for the object, a simulated virtual spectator area which is separate from the event area of the simulated arena and which is based on library information for the spectator stand of the arena; and a simulated user in the virtual spectator area, whereby the user is permitted to observe the simulation of the actual live event, and to provide interaction commands which permit the user to interact with at least one other user.

Preferably, the virtual world environment unit is configured to model one or more interactive elements with which a user may interact. Also preferably, the simulated user is restricted from accessing the entire simulated spectator area.

In another embodiment, the system is configured to present a substantially real-time simulation of an actual live event involving a moveable object in an arena, the system comprising a tag attachable to a moveable object involved in an actual live event in an arena, one or more base stations located relative to the arena and operable to receive a signal from the tag, and a location platform configured to determine the location of the tag in the arena based on the signal received from the tag by one of or each base station, and to output location data representing a location of the tag in the arena.

Advantageously, the virtual world environment unit includes an access interface in communication with the virtual world environment unit, the access interface being arranged to provide the user with access to the simulated arena and to permit the user to observe the simulated event in substantially real-time. In one embodiment, the signal received from the tag is an optical signal.

The system may further comprises an optical reference unit configured to track the location of a further object in the arena optically and to output further location data representing a location of the further object in the arena, wherein the virtual world environment unit is adapted to simulate the actual live event including the further object and movement of the further object in the arena using the further location data.

Advantageously, the system may further comprise one or more time stamp units arranged to associate time stamp data with the location data and the further location data such that the location data and further location data can be registered in the same time frame using the associated time stamp data.

Conveniently, the system may further comprise one or more additional tags attachable to respective additional objects involved in the actual live event, wherein the one or more base stations are operable to receive a signal from each respective tag, the location platform is configured to determine the location of each tag based on the signal received from that tag by the one or each base station, and to output location data representing the locations of each tag in the arena, and the virtual world environment unit simulates the actual live event including the objects and movement of the objects in the arena using the location data for each tag.

Still further, the access interface may comprise a server to receive a user request to observe the simulated event and to transmit a data stream to the user, the data stream representing the simulated event and being suitable to be used to simulate the event on a user display. The access interface may be adapted to permit two or more users to observe the simulated event and to receive one or more interaction commands from a user which permit the user to interact with at least one other user. If desired, the interaction commands are processed by the virtual world environment unit.

Another aspect of the present invention provides a method of operating a virtual world environment unit, the unit being operable to simulate an actual live event in substantially real-time, the method comprising the steps of: simulating an arena based on library information for an arena comprising a spectator stand, simulating an object in an event area of the simulated arena said object being involved in the actual live event, simulating movement of the object in the event area of the simulated arena based on substantially real-time location data received by the unit for the object, simulating a virtual spectator area which is separate from the event area of the simulated arena and which is based on library information for the spectator stand of the arena; and simulating a user in the virtual spectator area, whereby the user is permitted to observe the simulation of the actual live event, and to provide interaction commands which permit the user to interact with at least one other user.

Preferably, simulating a user in the virtual spectator area comprises restricting the simulated user from accessing the entire simulated virtual spectator area.

As still further aspect of the present invention includes a method of providing a substantially real-time simulation of an actual live event involving a moveable object in an arena, the method comprising the steps of: tracking the location of a moveable object in an arena and generating location data representing the location of the object in the arena by utilizing one or more base stations located relative to the arena to receive a signal from a tag attached to the moveable object, and determining the location of the tag in the arena based on the signal received from the tag by the or each base station; transmitting the location data to a virtual world environment unit; generating a simulation of the event in the virtual world environment unit; and permitting the user to access the simulated arena and observe the simulated event in substantially real-time.

A still further aspect of the present invention provides a method of viewing a substantially real-time simulation of an actual event involving a moveable object in an arena, the method comprising the steps of: receiving, at a user unit, a substantially real-time simulation of a live event involving at least one moveable object in an arena, the arena having a spectator stand; receiving a simulation of the user in a simulated spectator area of the simulated event, the simulated spectator area being separate from the arena and being based on the spectator stand of the arena; displaying the simulation of the actual live event; and receiving interaction commands from the user which permit the user to interact with at least on other user.

Preferably, receiving a simulation of a user in the spectator area comprises restricting the simulated user from accessing the entire simulated virtual spectator area.

BRIEF DESCRIPTION OF DRAWINGS

In order that the present invention may be more readily understood, embodiments thereof will now be described, by way of example, with reference to the accompanying drawings, in which.

DETAILED DESCRIPTION

Figure 1:
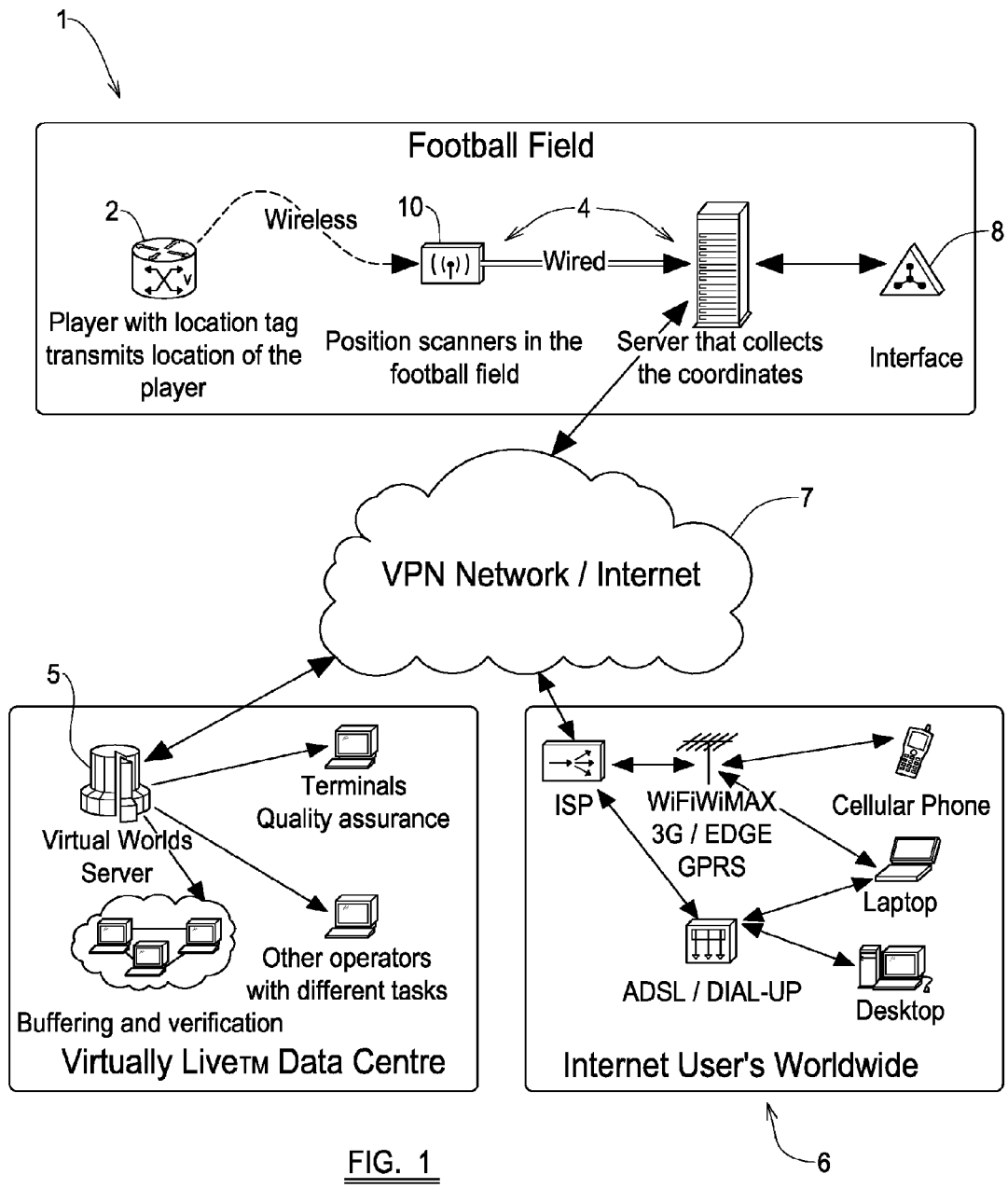
FIG. 1 is a schematic representation of the system architecture of an interactive media system embodying the present invention.
Figure 2:
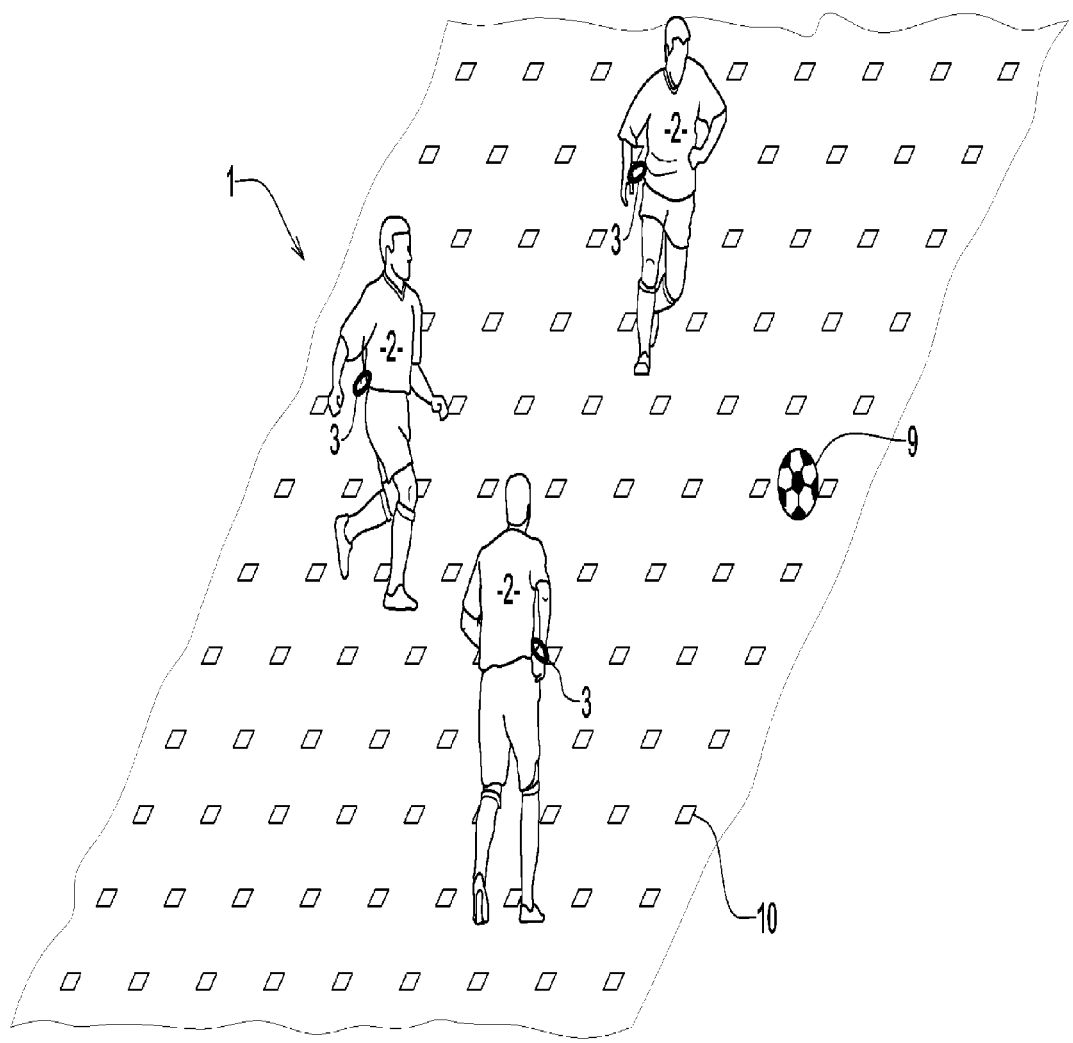
FIG. 2 is a schematic representation of elements of the interactive media system of FIG. 1.
Figure 3:
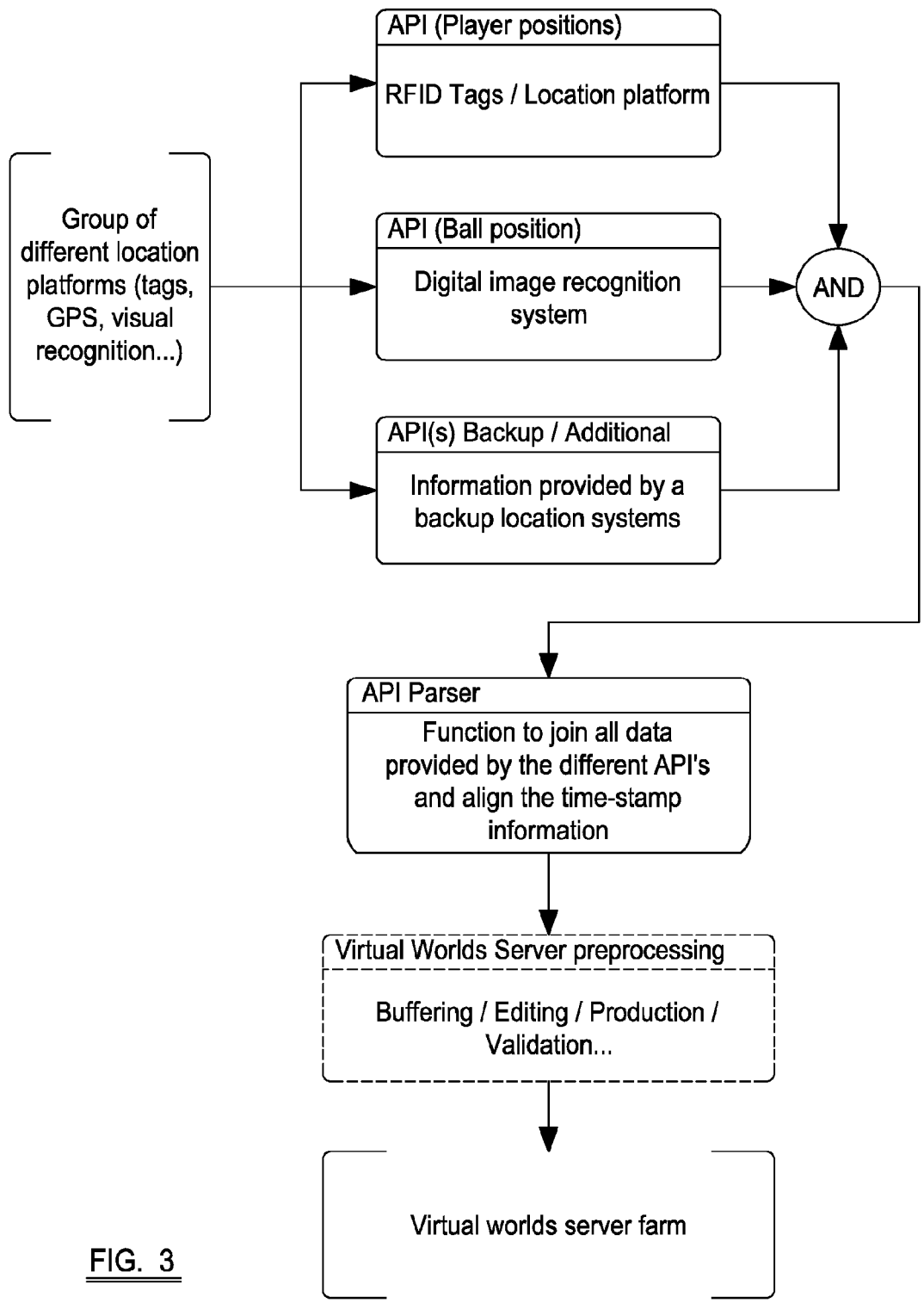
FIG. 3 is a schematic representation of the system of an embodiment of the present invention.

Embodiments of the present invention seek to provide an interactive media system which provides access to a live event over a network which may include the internet.

Live events to which embodiments of the present invention may be applied include, but are not limited to: soccer, basketball, tennis, cycling, athletics, volleyball, rugby union, rugby league, boxing, handball, swimming, baseball, football, cricket, religious events or services, music concerts, music festivals, theatre performances, musicals, comedy shows, opera, ballet/dance, the circus and the like.

An interactive media system embodying the present invention may comprise four main elements: a real world arena 1 having movable objects 2 which are location-tagged 3, the location of one or more movable objects 2 being derived by a location platform 4; a virtual environment comprising a computer-based simulated environment shared by many users and hosted on a local server 5 or hosted as a distributed network 6; users connected to and allowed access to the virtual environment over a communication network; and an interface 8 to furnish the virtual world environment with data from the real world arena.

Location Platform

An arena 1 existing in the real world comprises a 3-D space in which a live activity takes place and which has a 3-D co-ordinate system allowing any object 3, 9 in the arena 1 to have its location specified. Examples of arenas 1 are sporting arenas such as a motor racing circuit, a sporting stadium, a concert venue, a ski or winter sports course or circuit, a maritime environment in which a maritime event is taking place, the skies in which an aerobatic or aero-racing event is taking place and more confined spaces like a boxing ring or a snooker or pool table. All of these arenas 1 comprise the area where the actual activity is taking place as well as the environment around the arena in which spectators may observe the live event.

Objects 2, 9 taking part in the real world event are movable and comprise a mixture of animate objects and inanimate objects. In the example of a snooker table, the inanimate objects comprise the balls and the cue and the animate objects comprise the respective players or even portions of the players such as their hands, torso, fore-arms and head. The animate objects may also comprise umpires or referees or other match officials, in examples in which the event is a sporting event.

A location tag 3 may be attached to a movable object 2. Preferably, respective location tags 3 are attached to all of the movable objects 2, 9 in the arena 1. A location tag 3 may be attached to an object 2 by physical attachment, being strapped to the object 2, 9, being inserted into the object 2, 9, or being formed as part of the object 2, 9. The location tag 3 is associated with the movable object 2, 9 during the course of the live event and its function is to provide a means by which the location of the object 2, 9 within the real world arena 1 can be identified. A base station 10 is located in or around the arena 1 to receive signals from the location tag 3. The form of the base station 10 is dictated by the form of the location tag 3 or tags 3.

In one example, the location tag 3 is an active RFID tag. In other examples, the location tag 3 is a passive RFID tag. In another example, the location tag 3 comprises a GPS receiver. In a further example, the location tag 3 is a radio transmitter. The location tags 3 send a signal to the base station 10, which signal can be interpreted by the base station 10 to derive location information for that tag 3. The tag 3 may send more than one type of signal and/or a combination of signal types. The signal spectrum is radio frequency, optical, ultrasonic or any other form of signal operable to communicate with a base station 10. In examples, the location tag 3 is an active radio-frequency identification (RFID) tag—such a tag includes a power source such as a battery and transmits radio-frequency signals from which the location of the tag 3 can be determined. The location tag 3 may comprise a passive RFID tag—i.e. without its own power source (in the form of a battery). Passive RFID tags scavenge power from an external source. Other examples, of RFID tags may include hybrid tags which include a power source (e.g. a battery) and which scavenge power from an external source—i.e. Battery Assisted RFID tags.

The tag 3 may be a reflective marker which is configured to reflect a signal which is generated elsewhere and directed towards the tag 3 and/or more generally directed towards the arena 1. A suitable reflective marker may be configured to reflect a specific signal frequency or range of signal frequencies. Such tags 3 may be attached or coupled to animated objects and inanimate objects. The signal reflected from a tag 3 of this sort may be detected by the location platform 4. The signal may be a radio signal or an optical signal or any other suitable form of electromagnetic signal. The tag 3 may form part of the object to which it is attached or may be part of the clothing worn by an animate object. The tag 3 could be, for example, an entire item of clothing (such as a shirt).

In embodiments, the tag 3 is further configured to sense one or more parameters concerning the object to which it is attached. For example, the tag 3 may be configured to sense the heart rate of a person to which the tag 3 is attached and/or the temperature of that person.

In some embodiments, there is no separately identifiable tag 3 as such, but the entire animate or inanimate object is optically tracked—in other words, the object or a part thereof is the tag 3. In some cases this is achieved by tracking the movement of areas of contrast in an image (which may be assumed to be or registered as animate or inanimate objects for tracking). Other more complex image analysis techniques may be used to identify and track animate and inanimate objects in an image. In these embodiments, the location platform may automatically designate detected objects for tracking. The automatic designation may be supplemented or replaced by manual intervention by a user to designate objects for tracking within an image or series of images. Images of the objects being optically tracked may be processed to strip away background images and shadows to allow for easier identification and tracking of the objects.

The location platform 4 derives the location of the tag 3 from signals received from the location tag 3, the base station 10 or both and outputs location data representing a location of the tag 3 in the 3-D co-ordinate system of the real world arena 1.

The location platform 4 may in some examples comprise the base station 10, or a plurality of base stations 10, where the base station 10 or base stations 10 receive sufficient information from the signals from the location tag 3 to derive the location of the tag 3 and output location data representing the location of the tag 3 in the co-ordinate system.

In the example where the location tag 3 is a GPS receiver, the tag 3 is also operable to transmit a radio signal to a base station 10 or location platform 4 which can then readily derive the location of the tag 3 from the received signal.

Active, battery powered, location tags 3 and passive location tags 3 are configured as parts of clothing or shoes. The antenna loops and circuiting are provided as flexible elements which are interwoven with or adhered to the clothing or shoe fabric. In this manner, the location tag 3 becomes an integral part of the ordinary apparel worn by a participant. This is important so that the performance and experience of the participant is not influenced or impaired in any way by the presence of a location tag 3 or tags 3.

In one embodiment, the antenna loop of a location tag 3 is formed as part of the numbers applied to the back of a participant's shirt. The collar area is also a good location for embedding an antenna loop or other flexible circuiting of a location tag 3.

The location platform 4 in one example derives the location of a tag 3 with reference to an array of base stations 10 fixed at known locations throughout the arena 1. In this example, the location tag 3 may be a passive RFID tag 3. All the base stations 10 transmit a signal to the location tag 3 and the passive tag 3 reflects a unique signal to all the base stations 10. The reflected signal of greatest strength received by a base station 10 is most likely to be received by the nearest base station 10 to that passive tag 3. The location platform 4 deems the location tag 3 to be in closest proximity to that base station 10 and the location platform 4 derives the location of the location tag 3 as being the location of that base station 10 (which is of known location). The accuracy of such a system is determined by the proximity of the base stations 10 to one another in their array and obviously requires a very large number of base stations 10 to determine a reasonably accurate position of the location tag 3. Such a system is also affected by the orientation of the tag 3 which alters signal strength.

Another example is an almost inverse system in which an array of passive RFID transponders 10 are sited at fixed known locations in a grid or the like in and around the arena 1. The location tag 3 transmits a signal to the RFID passive transponders 10 and receives reflected signals from all of the passive RFID transponders 10 (or at least those in range). The location tag 3 itself sends data concerning the reflected signals, or the reflected signals themselves, to the location platform 4. The reflective signal of greatest strength represents the most likely closest RFID transponder 10 to the location tag 3 so the location platform 4 derives the location of the location tag 3 as being the location of that passive RFID transponder 10 in the array.

In another example, a fixed set of base stations 10 or cell stations 10 can be provided in or around the arena 1. In a learning process, an RFID location tag 3, preferably passive but it may also be active, is moved throughout the live arena 1 in an ordered manner and the signal characteristics received by the base stations 10 are logged for many locations of the location tag 3. This provides a map showing the signal characteristics at the logged locations—or a look-up table. In use, the signal characteristics of a location tag 3 are noted by the location platform 4 and entered into the map or look-up table and the best match tag location for those signal characteristics is returned by the map/look-up table thereby deriving the location of the tag 3.

The base station or stations 10 can use angle of arrival techniques to determine an azimuth and an elevation of an uplink signal from a location tag 3 at more than one base station 10 and that information can be used together with the same information from other base stations 10 to create bearings for the location of a tag 3 and hence derive the location of the tag 3 from the bearings.

Time of arrival techniques may also be used to determine the location of the location tags 3 in the arena 1 but such systems are difficult to implement because of the absolute synchronicity required to provide accurate positioning information. GPS is an example of a time-of-arrival technique.

Time-difference-of-arrival (TDOA) techniques can be used to derive an hyperbola of possible locations of the location tag 3 from each base station. The intersection of the hyperbolae can be used to determine the precise location of a location tag 3.

The location platform 4 can use a combination of some or all of the above techniques to derive location information for the location tag 3. Using a combination of techniques improves the redundancy of the system and the accuracy thereof. For example, a time-difference-of-arrival system can be used in conjunction with an angle-of-arrival system to identify a unique location solution.

Weight considerations and weight distribution considerations should be taken into account when selecting a location system to use with a movable object. The robustness of the location system should also be considered as inanimate objects such as balls are likely to experience significant impacts and accelerations during a live event. Passive RFID tags 3 may thus be better suited to such high impact environments than active location tags 3 or transceivers 3 which, although containing substantially only solid-state components, are still susceptible to damage.

As previously stated, the signals between the location tags 3 and the base station 10 are radio, optical, ultrasonic or any combination thereof. These signals include signals which originated outside of the tag 3 are reflected by the tag 3. The signals which originated outside of the tag 3 may be encoded with a particular frequency (to enhance the intensity of the signal reflected by a specific tag 3 or group of tags 3) and/or a particular sequence of pulses.

Clearly, there are likely to be a plurality of location tags 3 so the signals between the location tags 3 and base stations 10 are coded or otherwise multiplexed to allow the plurality of location tags 3 to co-exist and have their own individual signals sent to the location platform 4 and the location of each unique tag 3 derived therefrom. The individual signals identifying the location of a tag 3 are time-stamped or the signal arriving at the location platform 4 is time-stamped at the location platform 4. The time-stamped location information can be used downstream to collate the location of individual tags 3 at the same time.

In one example, all of the location tags 3 encode a unique identifier or signature in their signal. In other examples, the unique identifiers are provided in an array of RFID transponders in and around the arena 1 so that the location tag attached to the movable object 2 receives unique signals from each of the transponders 10 in the array and the location tag 3 is then operable to transmit signals to a base station or the location platform 4. The location platform 4 derives from the received signals which of the unique transponders 10 in the array the location tag 3 is closest to and hence determines the location of the location tag 3 as being at that unique transponder 10.

The location tag 3 and the base station 10 may be combined to comprise a location system which delivers telemetry information to the location platform 4. An example of such a system is where the location tag 3 is configured as a GPS receiver.

In cases where the inanimate object 9 to be tagged is very fast moving, it may not be appropriate to determine the position of the object 9 by radio-positioning techniques. A somewhat different style of location platform 4 and location tag 3 is required. Optical scanners are used as the base stations in and around the arena 1 and the location tag 3 may comprise the colouring or reflective coating of the inanimate object. The colouring or coating is tuned to be identified by the optical scanner. In one example, a ball 9 is tracked by optical scanners operating in a narrow spectrum and the ball 9 is coloured or coated so as to reflect light in the narrow spectrum detectable by the optical scanners. Using a combination of optical scanners and triangulation techniques, the accurate position of the fast-moving inanimate object can be detected and derived by the location platform 4.

The location platform 4 is configured as a server which collects the locations (and hence coordinates) of all the tagged objects 2, 9 in the real world arena 1 in real time. The location platform server 4 verifies the incoming data and discards any corrupt packages of information. Importantly, the location platform server 4 also standardizes the incoming data from the different types of location sensors and consolidates the information into a single co-ordinate system.

Time-stamping becomes especially important when location information is derived from a number of different sources. For example, location information for each of the participants 2 in a game is derived from a single system using a plurality of RFID transponders, one tagged to each participant. In the same scenario, the ball 9 or other game object has its location determined and tracked by a separate system, in this case using optical scanners, recognition techniques and tracking to determine the location of the ball 9 and subsequently track the ball 9. The location of the ball 9 is thus known in one system and the location of the participants 2 is known in another system. In order to collate all the location information in a common time reference, time-stamping is used in each system with a common time source. The result is that the different location signals or information for any participant 2 or object 9 in the arena is representative of its location at any given time and all the locations are known for the participants 2 and objects 9 relative to one another. Taking this contemporaneous location information allows the locations of all participants and objects to be re-created by rendering or representation in 2-D or 3-D, at any point in time or for a series of times. Indeed, an entire game may thus be re-created after the event in terms of the location and the participants 2 and the objects 9 in the game.

It will be appreciated that a mixture of optical and tag-based tracking can be used and that the location platform 4 may use this information to identify location information for the or each object—erroneous location information may be filtered out by the location platform 4. Erroneous location information may be identified in a number of different ways—e.g. comparing tag-based location information and optical location information, and/or the location information for other objects (be they other tracked objects or parts of the arena 1) relative to the object concerned.

The location platform 4 is also used to communicate the parameters of the respective arena 1. For example, where the arena 1 includes a playing surface or field, the dimensions and coordinates of key landmarks on the playing surface such as corner points, area boundaries, goal positions and center spot for a football pitch are stored on the location platform 4. For a motor racing circuit as the arena 1, the location platform 4 would store the track boundaries, extent of the pit lane, the start grid and the finish line.

Application Protocol Interface (API):

The application protocol interface (API) is connected to and fed by the location platform server or servers 4 in the case of there being many location platforms. The location platform server streams to the API interface the unique location tag identities together with the location coordinates for each respective location tag 3 in substantially real time. The interface also has a number of containers for each of the unique location tag identifiers which hold the attributes associated with the object that is tagged by that location tag. For example, if the tagged object is an individual or player 2, then one attribute is the player's name. Other attributes may be the side of the player 2 and whether the player 2 is in home or away kit. The attributes for an object are associated with that unique identifier and are transmitted with the unique identifier and the location co-ordinates to a virtual world server 5.

Since location information is received substantially in real time, any time stamping of the received signals from plural location platforms may be time-stamped at the API.

The interface also has containers for other attributes associated with the arena or the weather or conditions at the time. For example, the type or condition of the playing surface may be stored as an attribute and the prevalent weather conditions, temperature, location of the sun and the like may also be stored as attributes for the arena. These attributes would also be accessible from and are helpfully transmitted to a virtual world server 5. These attributes are also helpfully time-stamped, although to a lower resolution.

The information contained in the interface is deliberately buffered for a predetermined time interval so that the data can be verified, errors corrected and further attributes added to the data to be streamed therefrom. At very most, the delay is a matter of seconds.

The interface may also have containers for other information which may not be real time information—for example, player rosters and biography information.

The Communication Network:

The communication network 7 linking various elements of the interactive media system embodying the present invention is the Internet. However, bespoke networks or private networks are also utilized in other examples. In one example, a VPN network is used over the Internet 7. In this example, a VPN network connection network is established between the API interface and a virtual world server 5.

The Virtual World Server:

The virtual world server 5 is a single server in this example. In other examples, the server 5 is a distributed network. In one example, clients for the virtual world environment are installed on end-user computing devices such as desktop computers, lap-top computers, PDA's, tablet computers, games consoles, intelligent (internet enabled) television, or cell phones, each connected through the VPN network via an Internet service provider and respective wired or wireless network connections. The clients on the end-user computers allow access through the VPN network to the virtual world server 5.

The virtual world server may include an event ordering system or this may be provided through an associated website, telephone sales service or the like. The event ordering system is configured to allow perspective spectators to view an event calendar—searchable by type of event, date, time or the like—to identify one of more events which they would like to "attend". The event ordering system may be configured to receive an order for an event from a spectator and to provide, in return, one or more ticket options. Each ticket option may represent a different level of access to the event—e.g. a different seat position, access to a VIP or other exclusive area within the virtual world, and the like. The system is configured to receive the prospective spectator ticket selection and to issue a payment demand to the prospective spectator. The system may be configured to receive payment from the spectator or may direct the spectator through a third party website or other system to take payment for the ticket.

There are many examples of virtual world environments and those that concern us comprise a computer-based simulated environment intended for its users to inhabit and interact with one another as avatars which are graphically-rendered representations of the residents of that virtual world.

Such virtual worlds or virtual environments are also known as collaborative virtual environments, immersive virtual environments, massively-multiplayer on-line games. Multi-user domains are more text based fore-runners to virtual worlds as such and are probably not relevant here.

Specific examples of virtual environments are Second Life (Registered trade mark of Linden Lab), There and Teen Second Life (TSL).

The virtual environment consists of a combination of Things which may be avatars, portals, artifacts and rooms. Users of the system, or residents as they are sometimes better known, can add properties and methods to instances of these objects. One simple way of developing objects is to inherit properties from other objects. In the virtual environment of this example of the invention, the real world arena is stored in the virtual world server as an object in its own right. Some of the properties of that object may be the same as the real world arena but this is not essential. For example, if the real world arena has 30,000 seats, it may be that the virtual environment object modeling the arena has 100,000 seats. The properties of the object can be dictated by an administrator.

It is also possible for a multiple object to be modeled on the one arena, each with slightly different properties. Thus, the arena-side advertisements in one object might be in English, whereas in the other objects, the advertisements could appear in other languages such as German, Japanese or Chinese. These properties may be applied to the object (the modeled arena) at the host server or alternatively can be applied at the client installation and may therefore be user specific.

In any event, at least one object is stored in the virtual environment server which is a model of the real world arena having a similar 3-D co-ordinate system, at least when graphically rendered.

A user of a virtual environment, or resident when in the virtual environment, views a 3-D graphically rendered image of the environment, usually from a first person perspective. In this example, access to the virtual environment is restricted to a predetermined resident allowed to relevant sections of the virtual environment upon payment of a subscription or upon payment of a one-off charge for the duration of an event. Access for that resident/user is then enabled. Access is controlled by an administrator or a system with administrator rights. Access to the whole of the modeled arena or only specific areas of the modeled arena may be enabled and so a resident can be restricted to a certain seat in a stadium, the touch line of a playing field or a specific aerial view. Access may be granted to the whole of the arena—access all areas—in which case the resident is able to experience being part of the real live event by walking onto a playing surface and following a ball or, in the case of a racing circuit, driving a car alongside a real-life racing driver. Access for a user may be provided to an exclusive area of the arena—e.g. a corporate box—if that user has purchased the relevant ticket. In embodiments, a user may be given a pass to access various areas of the stadium. The pass may be time limited—e.g. the user may be able to access the grid of a motorsport event before a race commences or between races but may be prohibited from gaining access to the grid during a race. In an embodiment, access to a particular part of the arena (e.g. a corporate box) is at the discretion of another user and a user may send a message to that other user to request access to that part of the arena. The other user may be an administrator of the virtual world environment, and official associated with the relevant area of the arena, or a user who has purchased the right to control access to that part of the arena. Messaging may be achieved by voice, text, and/or video communications.

A user may view the live event through in the first person through the eyes of a player or performer in the live event.

In embodiments, the users select or are allocated an area within the virtual arena from which they can view the live event. This facilitates users gathering together in groups and allows for crowd control management.

An access interface comprising in one example the client software on a user computational device is in communication with the virtual environment server and, when enabled, gives a resident of the virtual world environment access to the virtual world environment and access to the arena in the virtual environment in which the moveable real world object is being modeled in substantially real time. The access interface is controlled by an administrator or by an automatic system having administrator rights. The resident corresponds to a real world entity such as an individual or, in the case of many individuals gathered before a single display, many individuals, and the resident provides a first person view to the real world entity allowing the modeled movement of the real world objects to be observed via the access interface in substantially real time. Substantially real time means that the delay in observing the real time event is only a very small delay comprising a matter of seconds at most and made up of normal telecommunication delays and buffering of the data for error checking and consolidation purposes at the location platform server and API interface.

Only a very small amount of data concerning the location of the moveable objects in the real life event need be transmitted to the virtual world server so that a tiny amount of bandwidth is used to render in 3-D, but also possibly only in 2-D, a graphical representation of the live event on a display device of the resident/user. This combination of technologies produces an incredibly realistic representation of a real time event with only a tiny amount of delay, of the order of seconds, and allows users to be presented with a customized or tailored view of the real life event.

In embodiments, data used in the virtual world environment—e.g. representations of players or parts of the arena—are downloaded to the user's display device in advance of the live event. Some data will only be available during the live event and this will need to be downloaded to the user's display device during the event. The user's display device (and/or computing device) may, therefore, connect to the virtual world server 5 one or more times in advance of the live event to prepare for the live event. On purchasing a ticket, embodiments may include a scheduling system which defines a download schedule to ensure that data used in the virtual world environment is downloaded, as required, to the user's device in advance of the event.

Users may interact with each other by using a Voice-over-IP service or an internet text chat service. These services may be provided by the system or may be provided by an external provider. In the latter case, the virtual world environment may include an interface or portal for the service or the service may be provided as part of a heads-up display visible to the user whilst viewing the virtual world environment.

The virtual world environment may include one or more virtual retailers, kiosks, and the like, from which users can purchase real or virtual items. For example, a user may purchase a virtual hotdog and, once purchased, an avatar representing the user in the virtual world environment may be altered to include a depiction of the hotdog held by the avatar. In another example, the user may view a virtual cap or t-shirt in the virtual world environment and may purchase the cap or t-shirt through the virtual world environment. The avatar representing the user may be altered to include the virtual cap or t-shirt, and/or a corresponding real cap or t-shirt may be sent to the user. A user may also purchase additional abilities for their avatar—for example, a new gesture. A user may also purchase, for example, an electronic media item such as a video, or audio track—in the same manner (the purchased media item being sent to a user's device or being otherwise made available to that device as a result of the purchase (e.g. as streamed media)). As will be appreciated, such transactions may be achieved by the user navigating their avatar to a virtual retailer or kiosk, and interacting with products and/or a sales assistant. The sales assistant may be automated or may be an avatar controlled by a real sales assistant in a remote location (with respect to the user). The virtual world environment may include a mechanism such that payment can be made for a purchase of an item (be it a virtual or a real item)—e.g. to collect credit card details or the like from the user through a pop-up window, a virtual payment interface, the exchange of virtual credits (with or without monetary value) or the like.

As mentioned above, the virtual world environment may include virtual advertisements—which may be for real and/or virtual products. The arena may include virtual billboards or hoardings to hold these advertisements. A click-through ability may be provided—such that the user can select an advertisement displayed in the virtual world environment and be directed to a website associated with the advertisement. The advertisements may be different for each user or for each group of users. The advertisements may include streamed advertisements. Advertisements may be provided as a banner across the user interface (such as a heads-up display) rather than appearing as part of the virtual world environment—thus being visible to the user irrespective of the view of the virtual world environment selected by the user.

The virtual arena of the virtual world environment may correspond in or more respects with the arena in which the live event is taking place. However, in embodiments, the virtual arena is different. Indeed, in embodiments, the virtual arena may be a representation of a different real arena or a non-existent arena. For example, the arena may be represented as being on the Moon and the physics of the virtual world environment (e.g. the effect of gravity) may correspond with that found on the Moon.

The virtual world environment may include a consistent or substantially consistent style or branding. This style may include features of, for example, popular cartoons or the like.

The virtual arena, however, is preferably a representation of an arena including a spectator stand—the spectator stand being adjacent the arena and/or event location (e.g. the football pitch). The user's avatar is displayed within a virtual version of the spectator stand. Thus, the virtual world environment is a representation of the arena and its spectator stand. The user is able to view the live event through the virtual world environment as if the user were present in a real spectator stand associated with an arena. The user is able to view the live event as if actually present as a real spectator at the live event—rather than watching the event by television for example (in which camera positions do not represent actual positions in which a spectator may view a live event).

Avatars representing users, players, and the like, may be customizable. Accordingly, each avatar may include one or more essential features which cannot be altered (team emblems, for example) and one or more optional features which can be altered (team colours). These alterations may be made by the user according to their preference—as graphical user interface may be provided to allow the user to customize the avatars. A user may also be able to customize aspects of the arena—which may also include essential (non-changeable) features and optional (variable) features. The customized virtual world environment may be unique to that user or access to the customized virtual world environment may be provided to a group of users.

The virtual world server 5 and/or other elements of embodiments of the invention may collect an archive of information. This archive may include information regarding the live event—player positions, passes, heart rate, speed of movement, duration of movement, weather conditions, and the like. The information may be used to provide statistics to one or more spectators or for broadcast providers—potentially at an additional cost. The virtual world server 5 and/or other elements of embodiments of the invention may also gather information regarding the spectators—which tickets are purchased, what services are used, which spectators interacted with each other, what other objects within the virtual environment a spectator interacted with, and the like. Such information may allow tailored services to be provided or new services developed to meet a perceived need identified from the information. The information about the live event and/or the spectators may be stored in a separate secure facility.

User management may be handled through an account-based system in which users step-up an account and place ticket orders and view events using the account.

Account management may be provided via the virtual world server 5 and/or through an associated website accessible by the user.

To ensure that each user experiences to the virtual world environment in the most appropriate manner, various client programs may be provided for download—with each program being tailored for a particular device or type of device. For example, a first program may be provided for downloading to a laptop, a second program may be provided for downloading to a mobile telephone (i.e. cellphone), and the like. The user may be required to purchase the relevant program. The program, once downloaded and installed, provides the client program which manages the connection to the virtual world server 5. The client programs may provide different facilities to the user depending on the processing and communication capabilities of the device in which they are being run.

The client programs may include two parts: a front end and a world client. The front end provides the user with an interface which allows for registration and profile management, and/or avatar customization, and/or ticket browsing, and/or ticket purchasing. The world client provides the interface through which the virtual world environment is viewed by the user.

The user may view the virtual world environment through an interface which presents an image of the virtual world environment and one or more of the following: a friends and groups window, a chat window, an information and game event log, text bubbles or emoticons, bookmarks or replays.

The friends and groups window may be the center of the user's social networking experience within the virtual world environment. The window may provide a user with the ability to interact with other users at the event. A facility may be provided to allow the user to manage their friends and buddy relationships. The user may use groups to manage their group membership list, find the location of members and view their status. The other users (who may be friends/buddies or in a group) are preferably other users of the system but, in embodiments, could include users from other systems and social networking systems (an interface being provided to allow interaction between systems).

The chat window allows users to chat with each other (e.g. by text, voice, or video). Via this window a user can broadcast to a plurality of other users based on preselected channels (Group, Friends, Local); the user can also receive such broadcasts from other users and filter the chat output by channel types. The window may include clickable user names which allow shortcut access to commonly performed actions such as Ignore, Add friend, Send buddy invite and Make a gesture, etc.

The information and game event log displays information about the event, players/performers or other recent events. This might include a live text commentary feed.

The text bubbles and emoticons may be used by small groups of spectators when watching an event together. Accordingly, text messages between users can be configured to show as a "speech" bubble for each avatar in the group. Emoticons can also appear in the bubbles or in the chat window.

The bookmarks and replays are used by users to mark a point of interest in the event, which will then be displayed as a visible icon on the event timeline. The event timeline may be viewable by the user during the event or may be accessed after the event. A user may click on the bookmark symbol to set the event data back to that point, allowing that action to be replayed. Replays can be saved to a favorites list for later viewing and can be sent to other users as an invitation to view a section of the event at that user's leisure.

Icons may be provided in the user interface to allow the user to control the view, the movements of their avatar (i.e. navigation), gestures made by their avatar, administrative options, and viewing modes—for example.

Objects within the virtual world environment may have a predetermined set of animated actions. For example, a virtual representation of a player participating in the live event may have predetermined animations to represent the player running forwards, or backwards, or kicking a ball. The predetermined animations may be common to more than one object. There may be special animations for particular objects—for example, a particular player may have a "signature move" for which a special predetermined animation is prepared for the virtual representation of that player if the real player performs the signature move. Such signature moves may include, for example, player celebrations—for which a special animation may be provided (the player may be given permitted to select their own special animation for such celebrations in advance of the live event). In an example, a player celebration may be linked to an advertisement and the particular animation of a player celebration may form part of an advertisement for a product or service (the provider of the product or service may purchase the right to have the particular animation shown).

An embodiment of the invention includes a broadcast mode and interface which can be used by, for example, television broadcasters to supplement video footage of the live event. The interface may permit a broadcaster to record the event or part of the event from multiple virtual camera angles—which may or may not correspond with actual camera angles used by the broadcaster (e.g. a "ball's eye view").

A separate class of avatar may be provided for members of the press. This avatar may be provided with additional gestures (compared to other avatars) and may include a visual indicator that the avatar is representative of a user from the press. For example, the avatar may be represented holding a camera or video camera. The press user may be provided with an "access all areas" pass—which may exclude certain private areas (such as corporate boxes). The interface for the press user may also include additional options to record aspects of the virtual world environment—e.g. an interview with another user, a player, or the like. The interface may only permit recording of an interview, if the other user has consented to the interview. Accordingly, the member of the press may send an interview request to another user and receive an acceptance of the request or the request may, of course, be declined. The member of the press may be prevented from recording the interview unless the acceptance has been received.

A virtual press room—a special form of corporate box—may be provided. The virtual press room may be decorated in a similar manner to a real press room.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A virtual world environment unit configured to simulate an actual live event in substantially real-time, the unit comprising:
   a simulated arena based on library information for an arena, the arena including an event area and a spectator stand, the simulated arena including a virtual event area and a virtual spectator area; and
   a simulated object in the virtual event area of the simulated arena, said simulated object corresponding to an actual object involved in the actual live event, wherein movement of the simulated object in the virtual event area of the simulated arena is based on substantially real-time location data received for the actual object in the actual live event;
   wherein the virtual spectator area is separate from the virtual event area of the simulated arena and includes a different simulated user location in the virtual spectator area associated with each of a plurality of users; and
   wherein the unit is configured to simulate the actual live event from a visual perspective determined by the different simulated user location of each of the plurality of users in the virtual spectator area.

2. The virtual world environment unit according to claim 1, wherein the simulated arena is based on library information for an actual arena in which the live event occurs.

3. The virtual world environment unit of claim 1, wherein the virtual spectator area of the simulated arena is based on library information for the spectator stand of an actual arena in which the live event occurs.

4. The system according to claim 1, further comprising a display system that provides each of the plurality of users a visual simulation of the actual live event produced in the virtual event area from a visual perspective determined by the simulated user location of each of the plurality of users in the virtual spectator area.

5. The virtual world environment unit according to claim 1, wherein at least one of the plurality of users is restricted from accessing the entire virtual spectator area.

6. The virtual world environment unit according to claim 1, wherein at least one of the plurality of users can move the simulated user location associated with the one of the plurality of users to different positions within the virtual spectator area.

7. The virtual world environment unit according to claim 6, wherein movement of one of the simulated user locations within the virtual spectator area results in the user associated with the simulated user location viewing the simulation of the actual live event from a different visual perspective via a display system.

8. The virtual world environment unit according to claim 1, wherein at least one of the plurality of simulated users is able to move the simulated user location associated with the one of the plurality of simulated users to multiple different locations within the virtual spectator area but is restricted from moving the simulated user location associated with the one of the plurality of simulated users to every possible location within the virtual spectator area.

9. The virtual world environment unit according to claim 1, wherein the virtual world environment unit is configured to model one or more interactive elements with which a user may interact in the simulated arena.

10. The virtual world environment unit according to claim 1, further comprising:
    a tag attachable to the moveable object involved in an actual live event in an actual arena;
    one or more base stations located relative to the actual arena and configured to receive a signal from the tag; and
    a location platform configured to determine the location of the tag in the actual arena based on the signal received from the tag by the one or more base stations, and to output location data representing a location of the tag in the actual arena.

11. The system according to claim 10, further comprising one or more additional tags attachable to respective additional objects involved in the actual live event; wherein the one or more base stations are configured to receive a signal from each respective tag, the location platform is configured to determine the location of each tag based on the signal received from that tag by each base station, and to output location data representing the locations of each tag in the arena; and wherein the virtual world environment unit simulates the actual live event including the objects and movement of the objects in the arena using the location data for each tag.

12. A method of creating a viewable virtual world environment that simulates an actual live event in substantially real-time, the method comprising:
    simulating, via a computer processor, an arena based on library information for the arena;
    simulating, via a computer processor, an object in a virtual event area of the simulated arena, said object being involved in the actual live event;
    simulating, via a computer processor, movement of the object in the virtual event area of the simulated arena based on substantially real-time location data received for the object;
    simulating, via a computer processor, a virtual spectator area of the simulated arena for one or more users, wherein the virtual spectator area is separate from the virtual event area of the simulated arena;
    determining, via a computer processor, a different simulated user location in the virtual spectator area associated with each of a set of users; and
    simulating, via a computer processor, the actual live event from a visual perspective determined by the different simulated user location in the virtual spectator area of the simulated arena associated with each of the set of users.

13. The method of claim 12, wherein the simulated arena is based on library information for an actual arena in which the live event occurs.

14. The method of claim 12, wherein simulating the actual live event from a visual perspective determined by a simulation user location includes displaying, to each of the set of users via a different display device, a visual simulation of the actual live event produced in the virtual event area from a visual perspective determined by the simulated user location in the virtual spectator area of the simulated arena associated with each of the set of users.

15. The method according to claim 12, wherein determining a simulated user location in the virtual spectator area comprises restricting the simulated user location for a particular user from accessing the entire simulated virtual spectator area.

16. The method according to claim 12, wherein determining a simulated user location in the virtual spectator area comprises enabling at least one of the users to move the simulated user location associated with the one of the users within the virtual spectator area and wherein movement of the simulated user location within the virtual spectator area results in the user associated with the simulated user location viewing the simulation of the actual live event from a different visual perspective.

17. The method of claim 12, wherein determining a simulated user location in the virtual spectator area comprises enabling at least one of the plurality of simulated users to move the simulated user location associated with the one of the plurality of simulated users to multiple different locations within the virtual spectator area, but restricting movement of the simulated user location associated with the one of the plurality of simulated users to every possible location within the virtual spectator area.

18. The method according to claim 12, wherein the virtual spectator area of the simulated arena is based on library information for a spectator stand of an actual arena in which the live event occurs.

19. The method of claim 12, further comprising:
    modeling one or more interactive elements with which a user may interact in the simulated arena.

20. A computer-readable medium having instructions stored thereon for performing the method of claim 12.

* * * * *